(12) United States Patent
Serrano

(10) Patent No.: US 6,837,654 B2
(45) Date of Patent: Jan. 4, 2005

(54) FIBER OPTIC CABLE SECURED IN A GROOVE

(75) Inventor: Jorge R. Serrano, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/317,534

(22) Filed: Dec. 12, 2002

(65) Prior Publication Data

US 2004/0115004 A1 Jun. 17, 2004

(51) Int. Cl.[7] ................................................ F16L 1/06
(52) U.S. Cl. ...................... 405/184.4; 405/157
(58) Field of Search ............................. 405/184.4, 157, 405/180

(56) References Cited

U.S. PATENT DOCUMENTS

| | | | |
|---|---|---|---|
| 3,722,225 A | 3/1973 | Empson | 61/72.1 |
| 3,952,532 A | 4/1976 | Spearman | 61/72.4 |
| 4,063,429 A | 12/1977 | Wilson | 61/105 |
| 4,464,082 A | 8/1984 | Isaacs | 405/157 |
| 4,785,559 A | 11/1988 | Hentschel | 37/94 |
| 4,812,078 A | 3/1989 | Rivard | 405/179 |
| 5,467,420 A | 11/1995 | Rohrmann et al. | 385/101 |
| 6,371,691 B1 * | 4/2002 | Finzel et al. | 405/157 |

FOREIGN PATENT DOCUMENTS

| | | | |
|---|---|---|---|
| DE | 2735079 A1 | 3/1978 | G02B/5/14 |
| DE | 3001226 A1 | 8/1980 | H02G/9/00 |
| DE | 8422532 U1 | 1/1985 | H02G/1/08 |
| DE | 3710038 A1 | 10/1988 | E01C/23/09 |
| DE | 4115907 A1 | 11/1992 | H02G/1/06 |
| DE | 4203718 A1 | 8/1993 | H02G/9/06 |
| EP | 0553991 A1 | 8/1993 | G02B/6/44 |
| FR | 2677137 A1 | 12/1992 | G02B/6/40 |
| JP | 57195206 A | 11/1982 | G02B/5/16 |
| JP | 60014208 A | 1/1985 | G02B/6/44 |
| JP | 61107306 A | 5/1986 | G02B/6/44 |
| JP | 06109931 A | 4/1994 | G02B/6/00 |
| JP | 08103012 A | 4/1996 | H02G/1/08 |
| WO | WO91/12119 | 8/1991 | B29B/47/06 |
| WO | WO92/13227 | 8/1992 | F16L/57/00 |

* cited by examiner

Primary Examiner—Frederick L. Lagman
(74) Attorney, Agent, or Firm—Timothy J. Aberle

(57) ABSTRACT

A longitudinal plastically deformable wedge is used to secure a fiber optic cable or other elongate member in a groove or channel cut in a paved roadway or similar solid surface. The wedge is extruded and has arms extending upwardly from a base forming an upwardly facing slot into which a fiber optic cable or other elongate member can be inserted after the wedge is positioned in the groove. The subsequently inserted, elongate member causes outward plastic deformation of the wedge. Ribs or barbs are provided along the sides of the arms to also grip the groove walls and provide additional retention. Longitudinally extending ducts can either contain fiber optic cable when the device is first inserted into the groove or cables can be subsequently inserted into these ducts.

19 Claims, 9 Drawing Sheets

FIBER OPTIC CABLE SECURED IN A GROOVE

BACKGROUND OF THE INVENTION

This invention relates to fiber optic cable and to apparatus and methods for installing fiber optic cables in a paved roadway or other similar surface or into solid ground.

U.S. Pat. No. 6,371,691 discloses a method for introducing a fiber optic cable in solid ground, such as a paved roadway, with the aid of a laying unit that includes a cutting wheel. This cutting wheel is used to cut a steep, thin channel or groove with steep sidewalls in the paved surfaces or solid ground. The fiber optic cable is then laid in this groove, and the cable is covered by a sealing material, such as bitumen. A foamed material can also be deposited in surrounding relationship to the cable near the bottom of the groove.

Several additional means for holding a fiber optic cable in the groove or channel are also disclosed in U.S. Pat. No. 6,371,691. One such device comprises an inverted metal channel with upturned edges that can engage the walls of the groove. This metal channel serves as upward protection and as a cable guard in addition to serving as an electrical return path for a power supply. An alternate hold down means, also disclosed in that patent, comprises an elongate solid member formed from an elastic or elastomeric material. Longitudinal ducts extend through the elastic body, and fiber optic cables can be drawn or blown though these ducts at a later time. Another duct with a slit extending along the top is also provided in the top of the profile body so that a fiber optic cable can be introduced into this top duct before the cable is laid in the channel or groove. Integral elastic barbs extend upwardly from the elastic body and engage the walls to fix the hold down device in the groove or channel. The profile body, however, does not appear to help hold the cables or the elastomeric device firmly in the channel or duct, nor is there cooperation between the cable and the hold-down device to increase retention force. In another embodiment, a strand of foam rubber is positioned above the fiber optic cable, but this strand of foam rubber is used as a release means between the fiber optic cable and filler material, such as bitumen, deposited on top of the fiber optic cable.

Although these approaches can aid in securing a fiber optic cable in an elongate groove, metal or elastomeric components can be relatively expensive. A plastic strip would be less expensive, but being plastically deformable a plastic wedge or strip having the same profiles as these metal or elastomeric devices would exert less retention force on groove sidewalls. However, a relatively inexpensive extruded plastic wedging strip would offer advantages if it could be inserted without requiring excessive force, but would still exhibit substantial resistance to movement of the fiber optic cable out of the groove. When a fiber optic cable expands longitudinally, when for example it expands thermally, the cable will bow generally in a sinusoidal fashion, and local sections can be urged upwardly out of its resident groove. External vibration and ice formation or ice heave can also cause a fiber optic cable to migrate from the groove toward the surface. These factors can be especially significant over time. Therefore, a relatively inexpensive means for holding the cable in a groove beneath the surface of a paved roadway or other solid member would be of value, especially if it can be installed without compromising current processes. The instant invention is believed to supply an inexpensive means for accomplishing this purpose.

SUMMARY OF THE INVENTION

According to this invention, a wedge for holding a cable in a groove comprises a plastically deformable one-piece member. This wedge has first and second arms extending upwardly from a base. Each arm has an inclined inwardly facing surface, and the inclined inwardly facing surfaces on the two arms face each other. The arms are deformable relative to the base when the wedge is positioned in the groove. The wedge prevents the cable from escaping the groove in response to longitudinal expansion of the cable relative to the groove or some other force tending to urge the cable upwardly out of the groove.

This longitudinal wedge is part of an assembly securable in a groove cut or formed in a paved surface such as a roadway or sidewalk, or in solid ground. The assembly also includes a cylindrical member, such as a fiber optic cable, a secondary cable or a tubular member. The longitudinal, elongate wedge comprises an extruded plastically deformable member at least partially surrounding the cylindrical member. The extruded plastically deformable member is more readily deformable than the cylindrical member. The extruded plastically deformable member at least partially surrounds the cylindrical member when the assembly is positioned in the groove. The plastically deformable member has an upwardly facing slot with a diverging upper section into which the cylindrical member can be inserted. The outer diameter of the cylindrical member is greater than a width of a lower section of the slot so that the extruded plastically deformable member is outwardly deformed when the cylindrical member is inserted into the lower section of the slot so that the extruded plastically deformable member is wedged in the groove to secure the assembly in the groove and to resist movement of the assembly out of the groove in response to longitudinal expansion of the assembly.

A method of securing a fiber optic cable in a paved roadway comprises the steps of first cutting a groove in the paved roadway or into the ground. The longitudinal wedge is then progressively inserted into the groove. The longitudinal wedge initially has a width that is greater than the width of the groove, and the longitudinal wedge is plastically deformable and has an upwardly facing diverging slot. An elongate cylindrical member, such as a fiber optic cable, a secondary cable or a tubular member is then progressively inserted into the upwardly facing diverging slot, after insertion of the longitudinal wedge into the groove. The elongate cylindrical member or wedge is then outwardly plastically deformed into engagement with walls of the groove to secure the fiber optic cable in the groove and to resist longitudinal thermal expansion of the fiber optic cable.

DETAILED DESCRIPTION OF THE PREFERRED EMBODIMENTS

Figure 1:
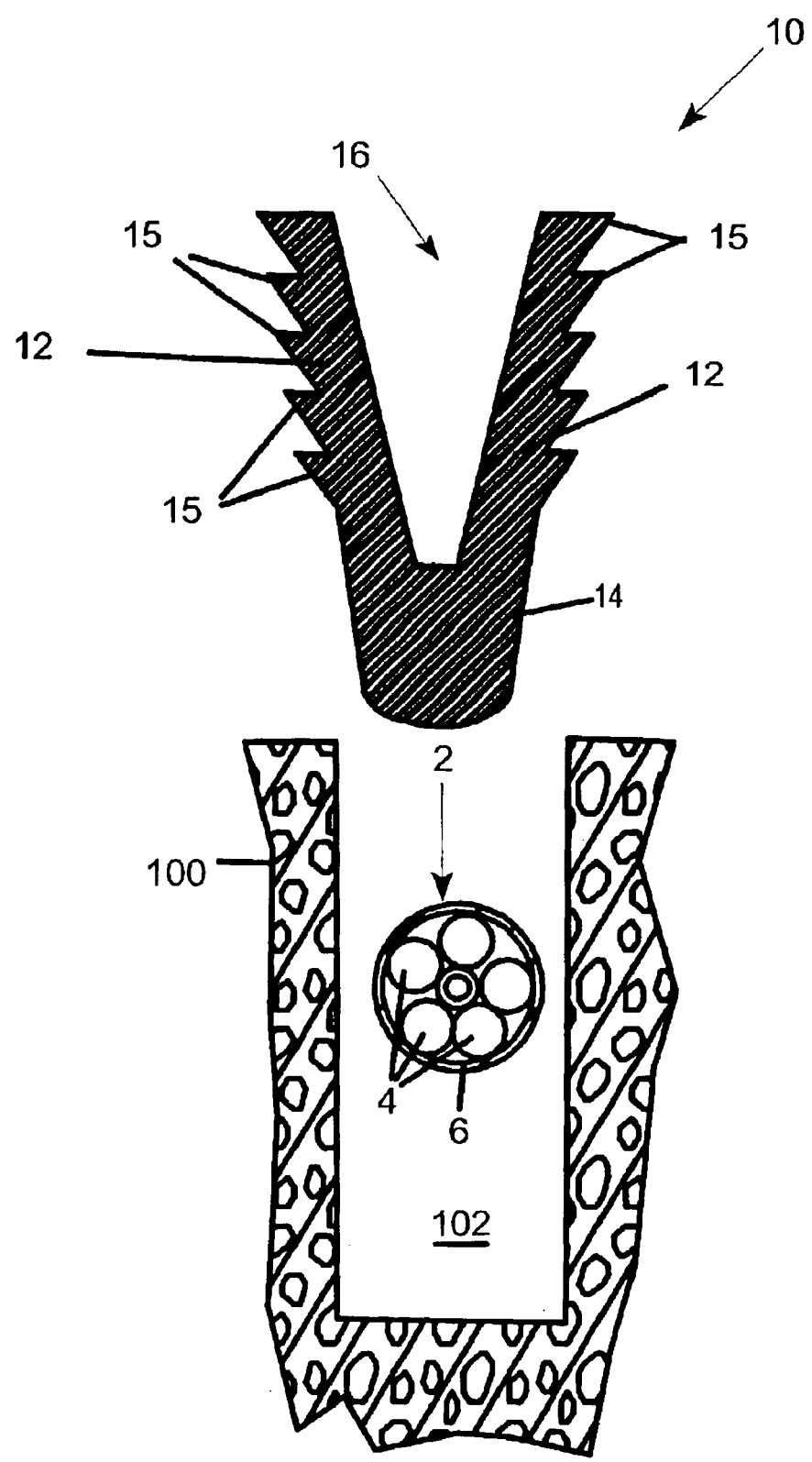
FIG. 1 is an exploded cross sectional view of a first embodiment of this invention in which a longitudinal wedge is inserted over a fiber optic cable to secure the cable in a groove.

FIG. 1 shows the first and simplest embodiment of a longitudinal wedge or elongate member 10 that can be used to secure a fiber optic cable 2 in a narrow elongate groove 102 cut into a paved roadway 100 or similar solid surface. Typically the width of the groove between the two vertically extending walls would be approximately 4–12 mm., and the groove could also be referred to as a channel or slot. Typically the depth of groove 102 would be 4–12 cm. A groove of this size would be suitable for use with a fiber optic cable having an external diameter of 3–10 mm. Groove 102 could be cut according to the method disclosed in U.S. Pat. No. 6,371,691, although other techniques could also be employed. The proportions of the groove shown in the various embodiments are not intended to be to scale, and these proportions have in some cases been altered for illustrative purposes.

The fiber optic cable 2 comprises a conventional fiber optic cable of the type normally used for outdoor or exterior installation. Representative fiber optic cable 2 includes a number of optical fibers 4, and the fiber optic cable is encapsulated in an exterior sheath, which can include a metal jacket, sheath or tube, such as a copper tube 6. The precise construction of the fiber optic cable is not a critical aspect of this invention, which should be suitable for use with most, if not all, conventional fiber optic cables that would be used for exterior applications Although this invention is intended primarily for use with fiber optic cables, it can also be used to install other cables including cables with copper conductors.

The longitudinal wedge 10 comprises a one-piece extruded member that would be continuously laid into a groove 102. For this embodiment, the longitudinal wedge 10 would be positioned above the fiber optic cable 2 in the groove 102. In the preferred embodiments of this invention, the longitudinal wedge 10 is formed of a thermoplastic, such as polyethylene or a polyolefin. Other thermoplastic materials could also be suitable. The longitudinal wedge 10 is therefore fabricated from a plastically deformable material instead of a more expensive elastic or elastomeric material, such as a silicone rubber. The maximum width of the longitudinal wedge member 10 is greater than the width of the groove 102 in which the wedge in to be used. When the longitudinal wedge member 10 is inserted into the wedge, it will be plastically deformed. Even though the wedge is plastically deformed and is not elastically deformed, it will still be more difficult to remove the longitudinal wedge 10 than it will be to progressively insert the elongate wedge 10 into the groove 102. The wedge 10 will therefore serve to restrain and secure the fiber optic cable 2 after the wedge is inserted into the groove 102, even though the wedge 10 is plastically deformed.

Longitudinal wedge 10 includes two upstanding arms 12 extending from opposite sides of a base 14. Each arm 12 is inclined or slanted relative to a vertical plane so that an upwardly facing, diverging or tapered or substantially V-shaped slot 16 is formed between the two arms 12. In the embodiment of FIG. 1, this diverging slot 16 provides space into which the arms 12 can bend when the longitudinal wedge 10 is progressively inserted into groove 102. Although there may be some tendency for the wedge 10 to return to its initial position after inward bending of the two arms 12, the plastic material from which the wedge 10 is fabricated or extruded, will be plastically deformed so that the arms 12 will not completely return to their original position, even after removal from the groove 102

Both of the arms 12 include a series of longitudinally extending ribs or barbs 15 along the exterior sides of the arms 12. Since the wedge 10 is extruded, these ribs or barbs 15 will extend continuously between opposite ends of the elongate longitudinal wedge 10. Each of the barbs 15 has a tapered lower surface and a substantially horizontal upper surface. It will therefore be easier to insert the wedge 10 into the channel 102 than to remove the wedge 10 from the channel 102, because the tapered lower surfaces of the ribs 15 will not grab the groove walls during insertion. Since the upper rib surfaces are not tapered or inclined, the ribs or barbs 15 will tend to resist extraction of the longitudinal wedge 10 from the groove 102. Perhaps more importantly, the ribs or barbs 15 will also resist forces tending to push the wedge upwardly out of the groove 102. Longitudinal expansion of a fiber optic cable 2 located in a groove 102 would cause the cable to bow or attempt to assume a substantially sinusoidal configuration within a groove of fixed length, thus resulting in an upward force along certain sections of the fiber optic cable 2. An upward force could also result from vibration or ice heave due to freezing moisture or for other reasons. This upward force would be resisted by the plastically deformed longitudinal wedge 10 and the barbs 15 would act to increase the force needed to push sections of the cable upwardly out of the groove 102. The asymmetric ribs or barbs 15 will thus serve to increase the force required to force the cable 2 out of the groove 102, but the ribs or barbs 15 will not unduly increase the insertion force.

Figure 2:
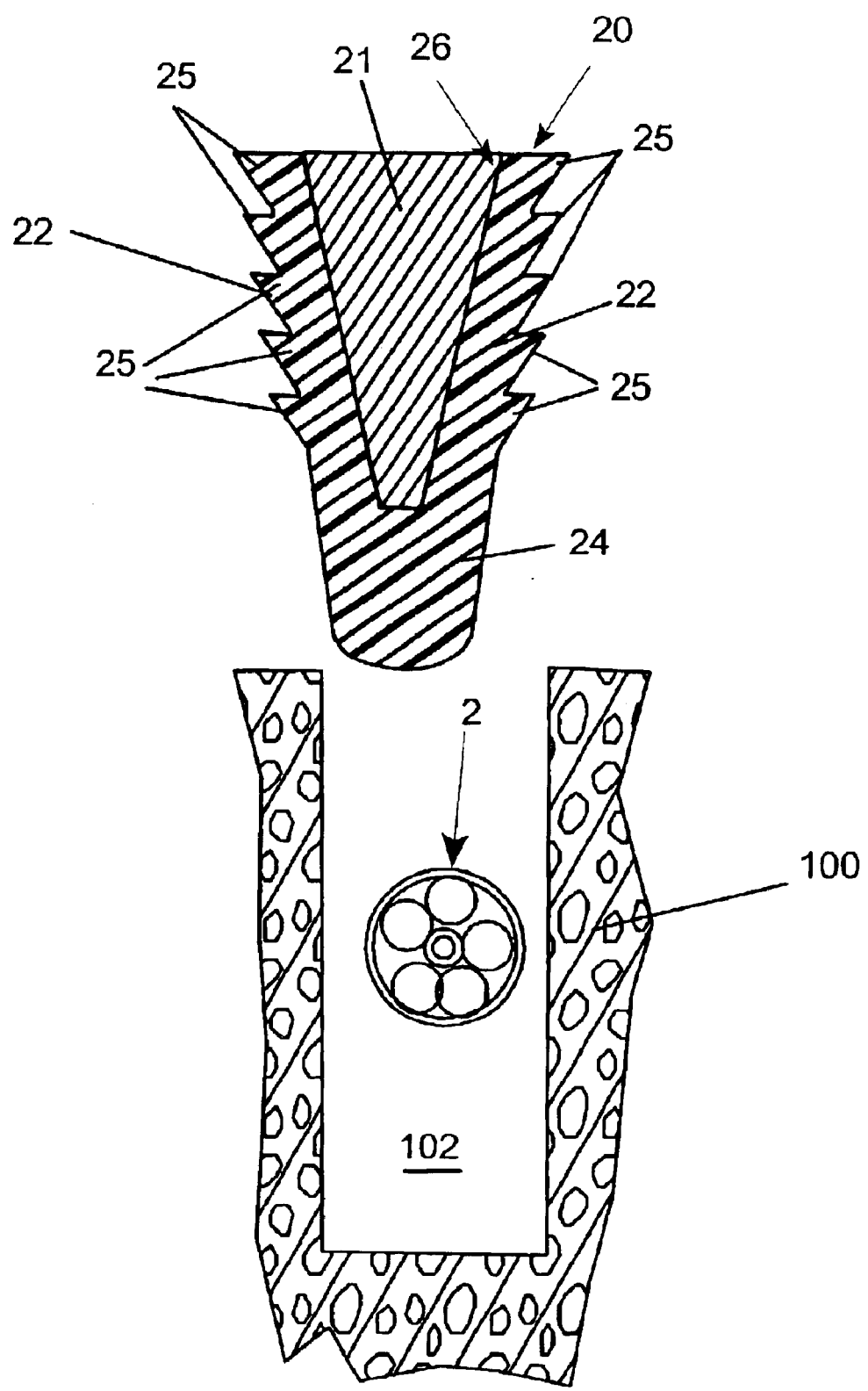
FIG. 2 is an exploded cross sectional view of a second embodiment of this invention in which a longitudinal composite wedge is inserted over a fiber optic cable to secure the cable in a groove.

FIG. 2 is a second embodiment of this invention that is in many respects substantially the same as the first embodiment shown in FIG. 1. The wedge 20 is also inserted into the groove 102 above a fiber optic cable 2. Wedge 20 is also extruded from a plastically deformable material such as polyethylene, and arms 22 extend upwardly and outwardly from base 24. Barbs 25 are located along the exterior of the arms 22. Barbs or ribs 25 can be substantially identical to the ribs or barbs 15 on the first embodiment of this invention, and will function substantially the same. The retention force as well as the insertion force of the wedge 25 will however be greater than the corresponding forces of the embodiment of FIG. 1. An elastomeric or more elastic member 21 fills the upwardly facing slot 26 between the outwardly inclined arms 22 in this second embodiment. This relatively more elastic member 21 will therefore increase the outwardly directed force tending to hold the plastically deformed arms 22 in engagement with the walls of groove 102, and will thus tend to increase the retention force. The relatively more elastic member 21 can be fabricated by foaming the same material from which the longitudinal member 20 is extruded. A foamed polyethylene will have greater elasticity than a relatively more solid polyethylene body comprising the arms 22 and the base 24.

Figure 3:
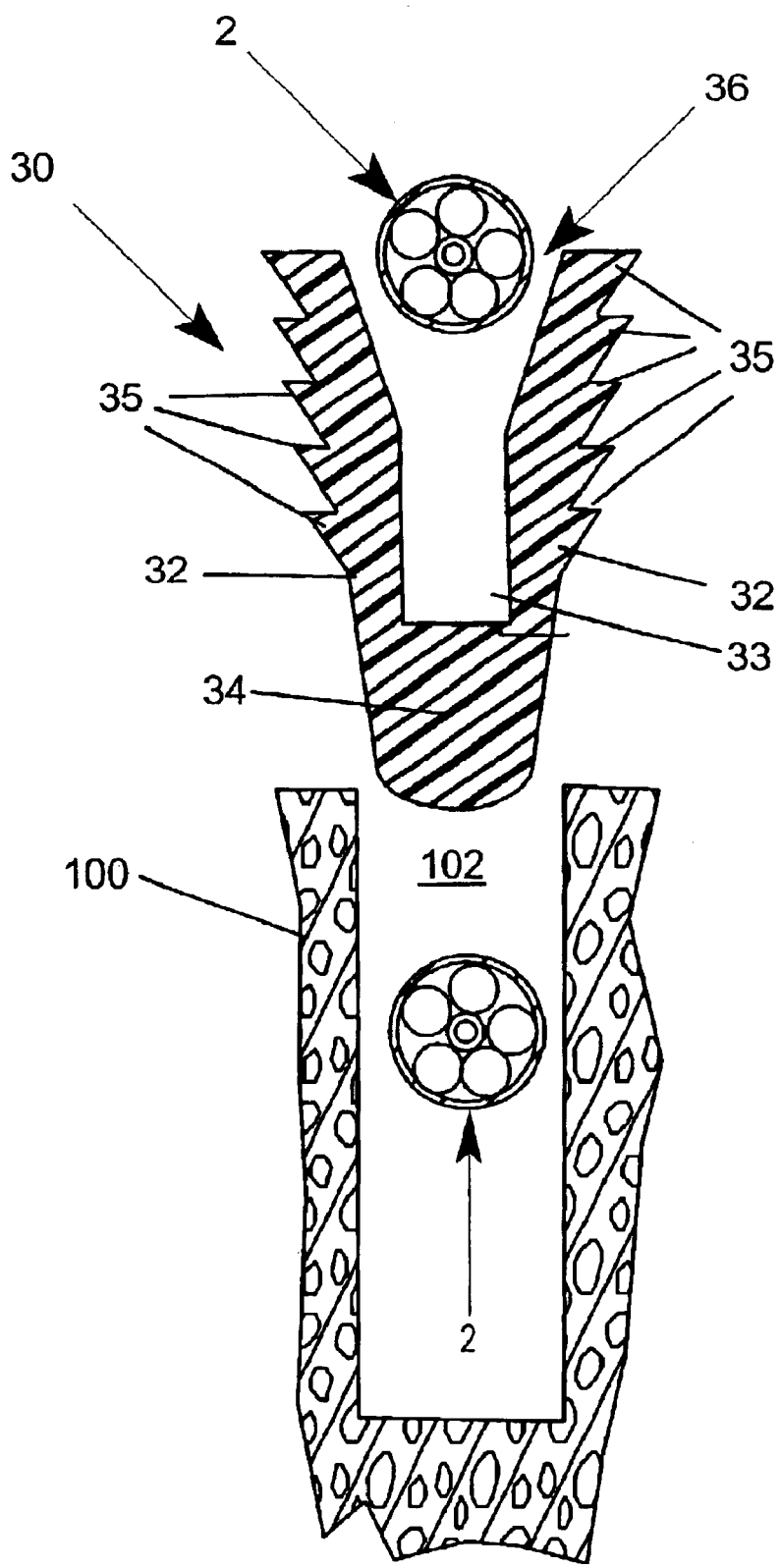
FIG. 3 is an exploded cross sectional view of a third embodiment of this invention in which a fiber optic cable is inserted into a plastically deformable longitudinal wedge to secure the cable in a groove.

In the third embodiment of this invention shown in FIG. 3, the fiber optic cable 2 is inserted into the groove 102 from above the longitudinal wedge 30. The longitudinal wedge 30 is first progressively inserted into the groove 102. Some plastic deformation of the wedge 30 will occur, but there will still be space remaining in the groove. The fiber optic cable will then be progressively inserted into the upwardly facing slot 36 resulting in further plastic deformation of the wedge 30 and additional retention force applied to the fiber optic cable 2. The third wedge 30 is also extruded from a plastically deformable material such as polyethylene. Wedge 30 also has two arms 32 extending upwardly from base 34, and each arm 32 also has a series of barbs or ribs 35 located on exterior arm faces. Upwardly facing slot 36 formed between the arms 32 also has diverging surfaces adjacent the top of the arms 32 to facilitate entry of the fiber optic cable 2 into the slot 36. The lower section of the slot 36 is in the form of a vertical channel 33 formed by two vertical walls that are spaced apart by a distance that is less than the external diameter of the fiber optic cable 2. As the fiber optic cable 2 is forced into this vertical channel 33, the arms 32 will bulge further outward towards the walls of the groove 102. The ribs or barbs 35, which will then be further deformed will provide additional space for outward deformation of the arms 32. Thus even though the fiber optic cable 2 is inserted after insertion of the wedge 30, the cable 2 will still be constrained by the plastically deformable longitudinal wedge 30.

Figure 4:
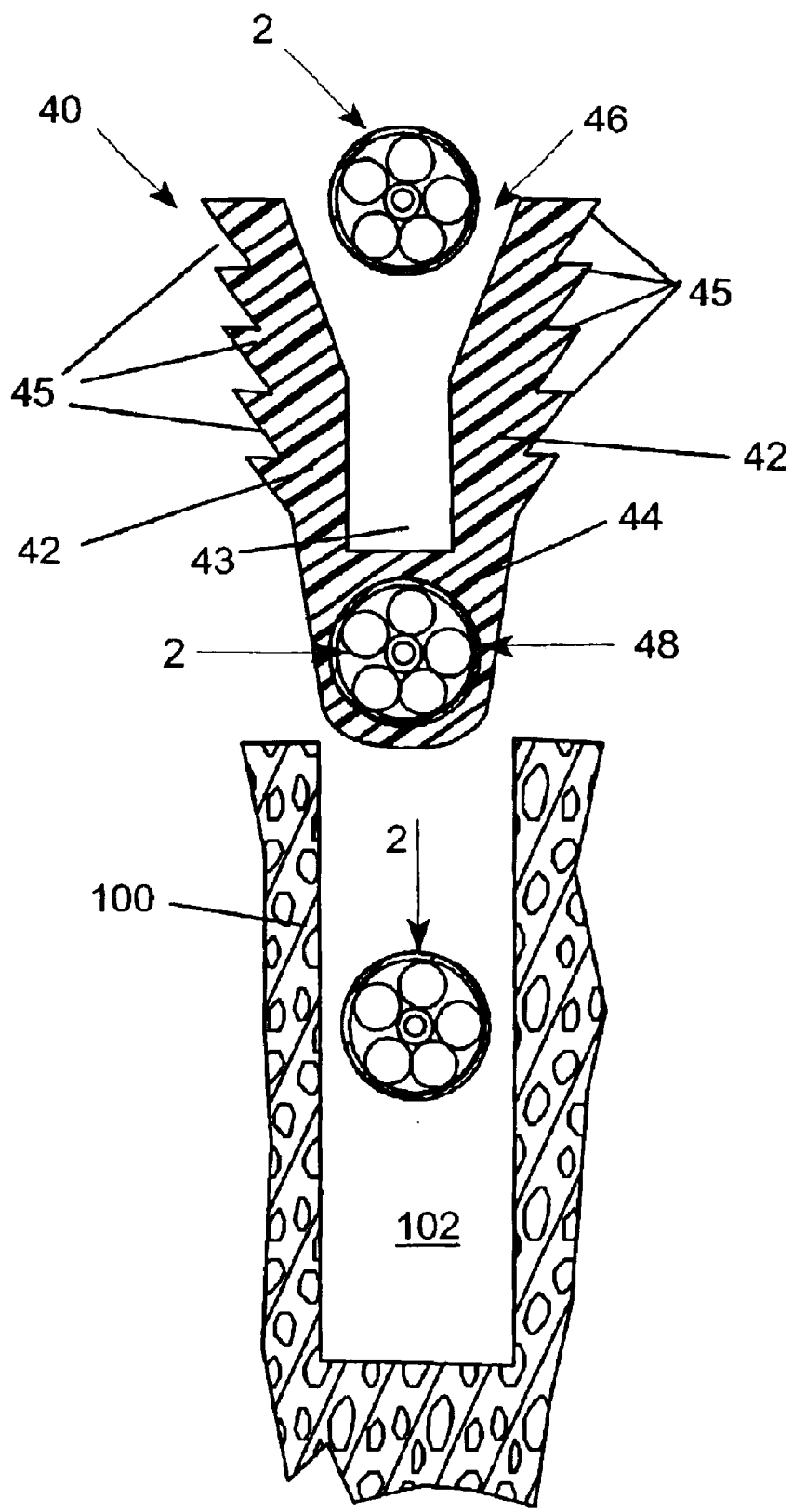
FIG. 4 is an exploded cross sectional view of a fourth embodiment of this invention in which a plastically deformable longitudinal wedge with a duct containing or receiving a fiber optic cable is inserted into a groove and in which a secondary cable or wire is inserted to outwardly deform the wedge.

FIG. 4 shows a fourth embodiment of the longitudinal wedge 40 that is in many respects substantially the same as the embodiment of FIG. 3. However, in this embodiment, the wedge 40 includes a cylindrical longitudinal duct 48, which extends through the base 44. This duct 48 is dimensioned to receive a fiber optic cable 2 that can be positioned in the duct 48 prior to insertion of the longitudinal wedge 40 into the groove 102. Alternatively a fiber optic cable 2 can be inserted through the duct 48 after the wedge 40 has been positioned in the groove 102, since the base 44 of wedge 40 will not be deformed by insertion of the wedge 40 into the groove 102, or any deformation will be relatively minor due to the plastic material from which the wedge 40 is fabricated. If the wedge 40 were fabricated from an elastomeric material, either a corresponding duct would be elastically deformed or a reinforcement member would probably need to be introduced. Wedge 40 is otherwise substantially the same as wedge 30 and includes arms 42 extending upwardly form base 44. Ribs 45 are formed on exterior faces of arms 42, and a vertical channel 43 is located at the lower end of the upwardly facing slot 46. A secondary cylindrical member 8 or a fiber optic cable 2 is pressed into the slot 46 and the channel 43 after the wedge has been progressively inserted into the groove 102. This secondary cylindrical member 8 can be wire, metallic cable or some other member that is less subject to deformation than the longitudinal wedge 40. Alternatively a fiber optic cable 2 could be inserted into the slot 43.

Figure 5:
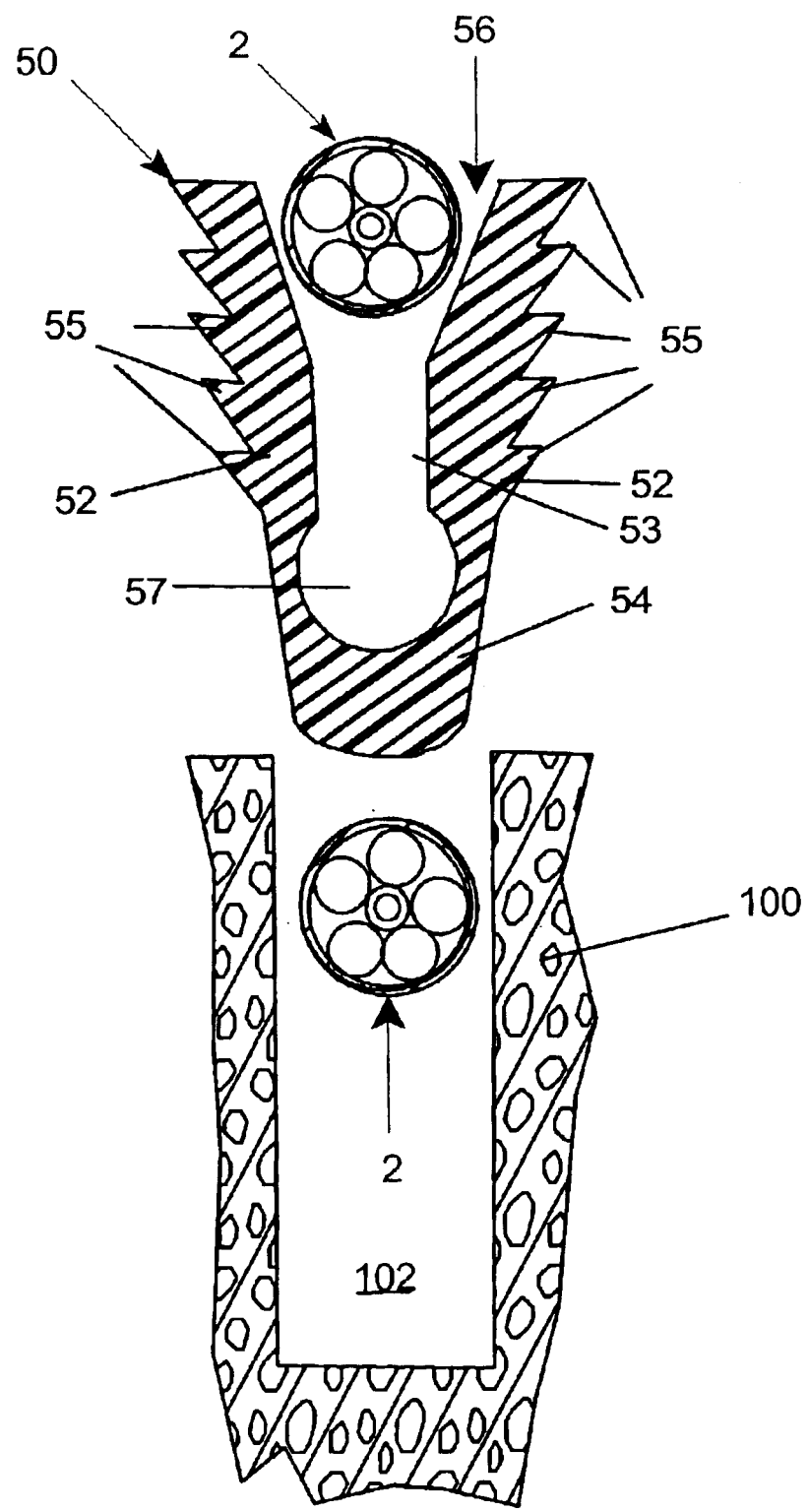
FIG. 5 is an exploded cross sectional view of a fifth embodiment of this invention in which a fiber optic cable is inserted into a slot in a plastically deformable longitudinal wedge to secure the fiber optic cable in a groove.

The wedge 50 in the embodiment of FIG. 5 is also similar to the wedge 30 embodiment of FIG. 3. The primary difference is that wedge 50 includes a semicylindrical pocket 57 at the bottom end of the vertical channel 53, which in turn communicates with the upper diverging section of the slot 56. The pocket 57 is dimensioned to receive and trap the cylindrical member inserted into the slot 56 after the wedge 50 is placed in the groove 102. In the embodiment of FIG. 5, this cylindrical member is a fiber optic cable 2. The pocket 57 would thus provide more positive retention of the fiber optic cable 2 progressively inserted into the groove 102 after the longitudinal wedge 50 was first in place in the groove 102. Extruded wedge 50 also has two arms 52 extending upwardly from a base 54 with ribs 55 extending outwardly to engage and grip the walls of the groove 102.

Figure 6:
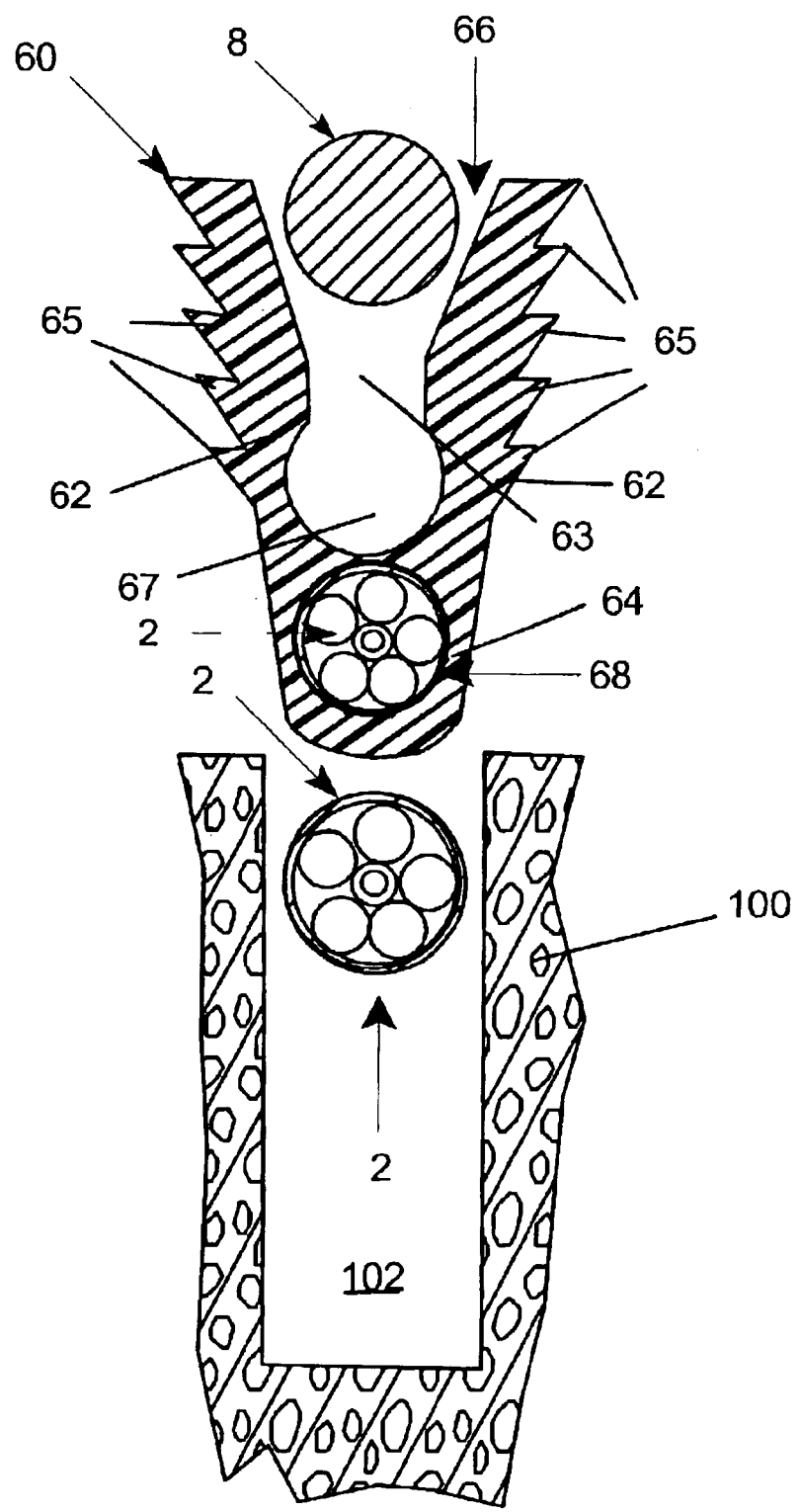
FIG. 6 is an exploded cross sectional view of a sixth embodiment of this invention in which a plastically deformable longitudinal wedge with a duct containing or receiving a fiber optic cable is inserted into a groove and in which a secondary cable or wire is inserted to outwardly deform the wedge.

FIG. 6 shows another embodiment of the wedge 60 that combines features of the wedges 40 and 50. Wedge 60 includes both a duct 68 and a cylindrical pocket 67 positioned above the duct 68 at the lower end of channel 63 and of upwardly facing slot 66. A fiber optic cable 2 can be inserted into the duct 68 before or after the wedge 60 is placed in groove 102. As shown in FIG. 6, a secondary cable 8 can be inserted into the slot 66 formed between arms 62 above base 64. Again the ribs or barbs 65 provide additional retention as well as space for additional plastic deformation of the wedge 60 as the secondary cable or wire 8 is inserted into the groove 102. Of course a fiber optic cable 2 can be substituted for the secondary cable 8.

Figure 7:
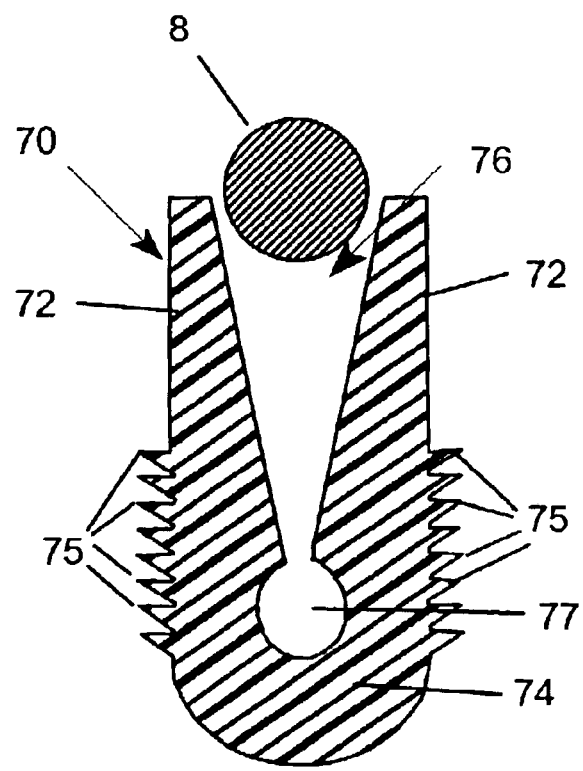
FIG. 7 is an exploded cross sectional view of a seventh embodiment of this invention in which a plastically deformable longitudinal wedge having vertical exterior sides with ribs or barbs extending therefrom is insertable into a groove to secure a fiber optic cable.
Figure 7:
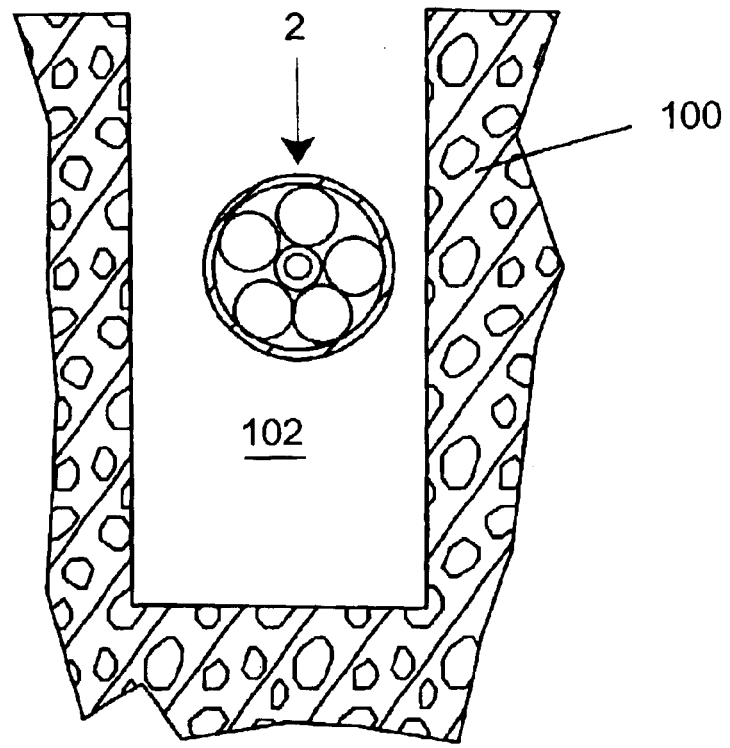

The wedge 70 shown in FIG. 7 differs from the other embodiments primarily in the shape of the arms 72 that extend upwardly from the base 74. Arms 72 have generally vertical exterior walls and the thickness of the arms progressively increases toward the curved base 74 because of the tapered or inclined inner wall arms forming the upwardly facing, diverging slot 76. A pocket 77 is located at the base of the diverging slot 76, and ribs or barbs 75 are located on the outside of the arms 72. A cable 8 is inserted through the diverging slot into the pocket to cause outward plastic deformation of the wedge 70. As shown in FIG. 7, the wedge 70 is placed above a fiber optic cable 2, although as with other embodiments, a fiber cable 2 can be used instead of the secondary cable, cylindrical member or pipe 8.

Figure 8:
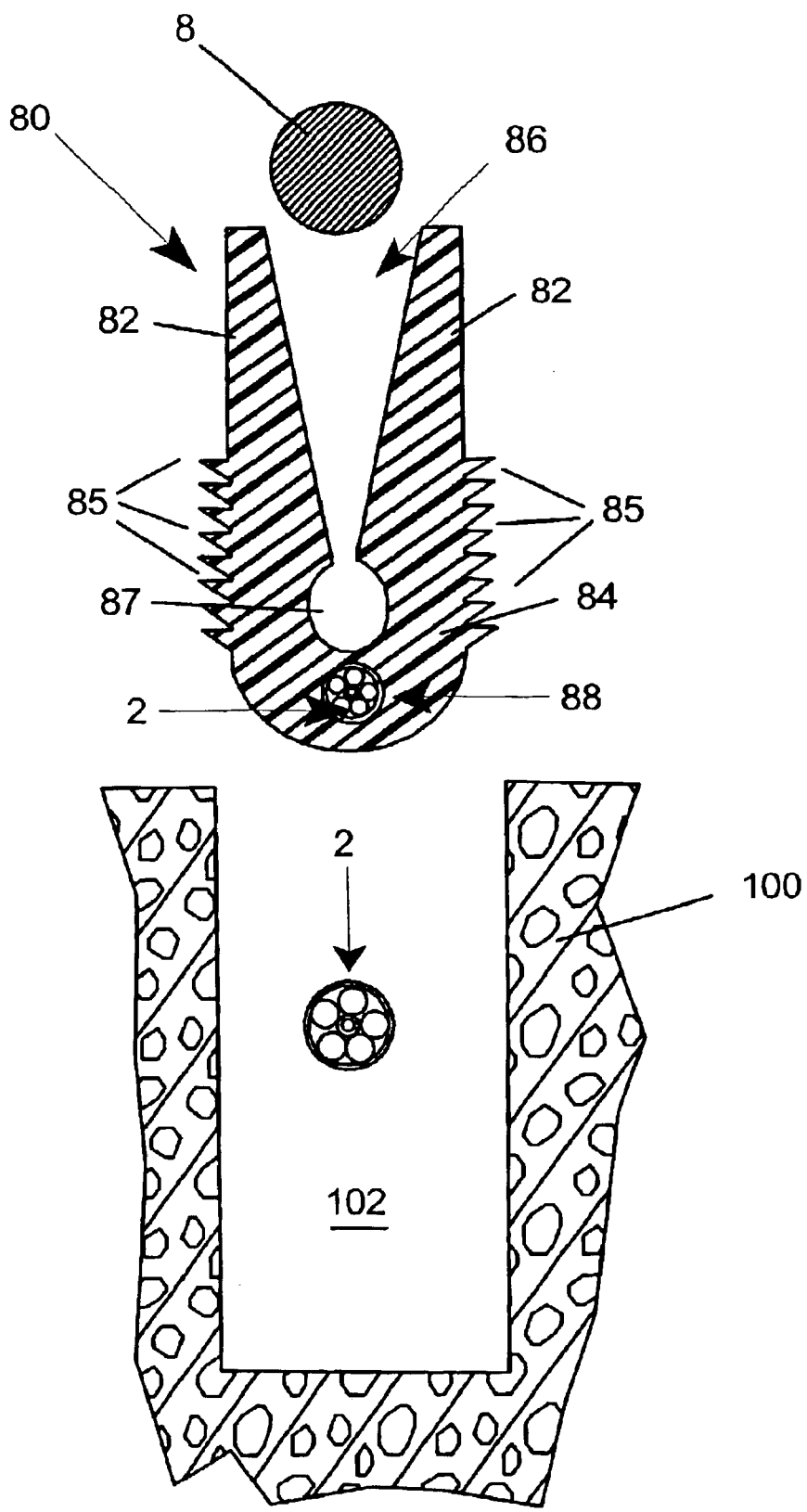
FIG. 8 is an exploded cross sectional view of an eighth embodiment of this invention that is similar to the seventh embodiment of FIG. 7, but also includes a duct containing or receiving a fiber optic cable.

FIG. 8 shows another version of a longitudinal wedge 80, which is in most respects substantially the same as wedge 70 shown in FIG. 7. Wedge 80 includes a cable duct 88 located below the pocket 87 into which the upper cylindrical member 8 is inserted. As shown herein this upper or secondary cylindrical member 8 can comprises a metal member or a wire. Alternatively, the cylindrical member 8 could comprise a plastic strand, also fabricated from a material such as polyethylene. A fiber optic cable 2 can be inserted though cable duct 88, either before or after the wedge 80 is inserted into the groove 102, and either before or after the cylindrical member 8 is progressively inserted through upwardly facing diverging slot 86 and into pocket 87. The arms 82 and the ribs 85 are substantially the same as arms 70 and ribs 75. The only difference between base 74 and base 84 is the presence of the cable duct 88.

Figure 9:
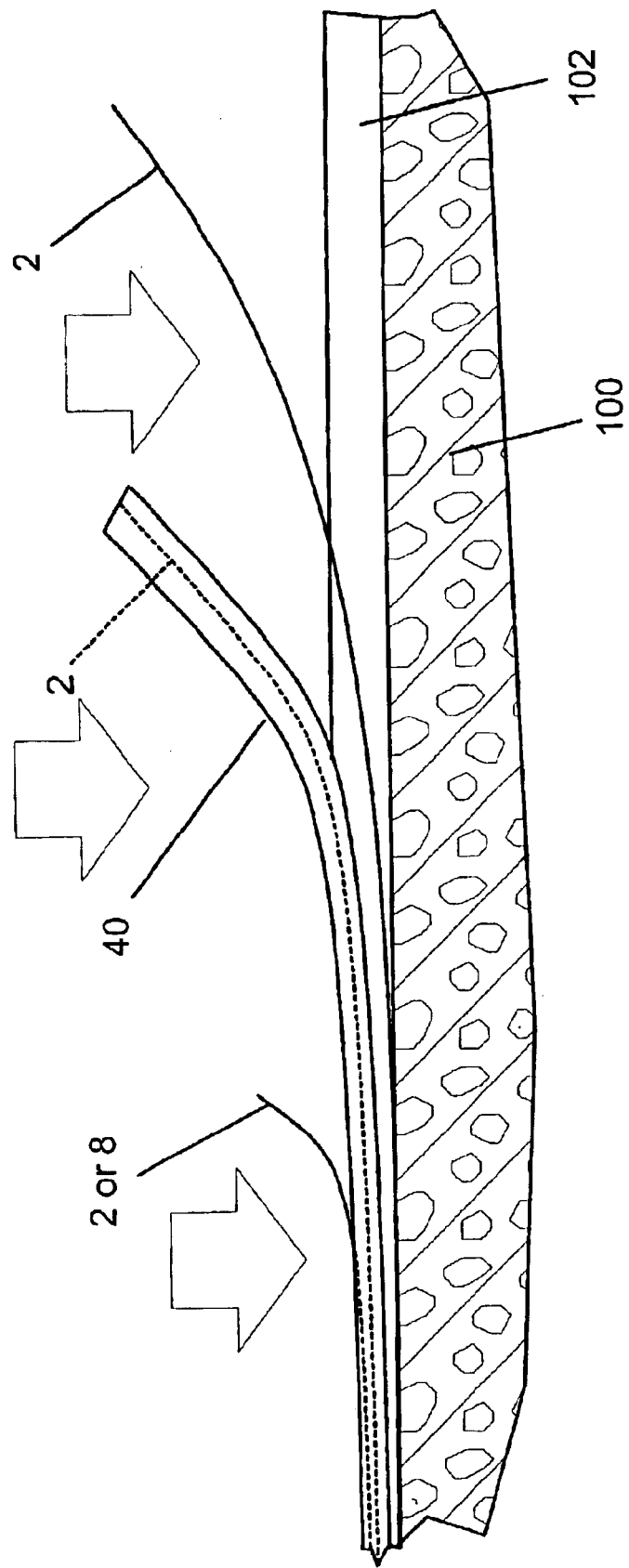
FIG. 9 is a schematic view illustrating the manner in which fiber optic cables and a longitudinal wedge can be inserted into a groove in a roadway.

FIG. 9 illustrates the manner in which cables and wedges can be inserted into a groove 102 that has been cut into pavement or other solid material. FIG. 9 specifically shows progressive insertion of a fiber optic cable 2 or wire 8 into a longitudinal wedge 40 that has been previously progressively inserted into the groove 102. These two longitudinal members can be sequentially inserted as part of the same procedure or operation, with insertion of the cable 2 following closely behind insertion of the wedge 40. FIG. 9 also shows a second fiber optic cable 2 that was inserted into the groove 102 below the wedge 40 and just prior to insertion of the wedge 40. Rotating wheels traversing the length of the groove 102 could be used to press the cables and wedges into place in the groove. Although FIG. 9 illustrates installation of only one version of the wedges shown herein, the same or similar techniques would be employed with any or all of the wedges depicted herein. The only difference is the sequence in which the fiber optic cable 2, the wedge and a secondary cable would be inserted. In the embodiments of FIGS. 3–8 multiple fiber optic cables 2 can be positioned in the same groove 102 with the aid of one of these wedges. In each of these cases, a fiber optic cable can be inserted below the wedge. In each of these cases a fiber optic cable can be inserted above the wedge. In the embodiments of FIGS. 4, 6 and 8 the ducts 48, 68 and 88 either contain a fiber optic cable 2 at the time of insertion, or permit insertion of an additional cable 2 at a later time without requiring extensive excavation of the groove 102. If however, it becomes necessary to remove the fiber optic cable from a groove 102, the continuous longitudinal wedges provide a simple means for extracting cable positioned above the wedges or located in ducts extending through the wedge. One end of the longitudinal wedge can be simply pulled upwardly and the wedge and cable assembly can then be progressively stripped from the groove. In that case only the conventional sealant material or bitumen that has been deposited on top of the wedge needs to be removed. In some cases the longitudinal wedge can simply be pulled upward through the bitumen or conventional sealant material that fills the groove. In other cases the bitumen or other material may scraped out of the groove. Alternatively, the plastic wedge can be simply cut out of the groove with a simple rotary cutter.

Although a number of alternative embodiments have been depicted herein, it should be apparent that other embodiments of this invention would be apparent to one of ordinary skill in the art and would require only minor modifications of the representative embodiments shown herein. Therefore the invention is defined not by the alternative representative embodiments, but by the following claims.

I claim:

1. A wedge for holding a cable in a groove, the wedge comprising a plastically deformable one piece member, the wedge having first and second arms extending upwardly from a base so that an upper portion formed by the first and second arms of the wedge is wider than the base, the arms being spaced apart to form an upwardly facing slot above the base, the arms being deformable relative, to the base when the wedge in positioned in the groove, wherein a plurality of ribs extend outwardly from each arm, the ribs projecting laterally beyond the arms and the base.

2. The wedge of claim 1 wherein each rib includes a downwardly facing inclined surface and a horizontal upper surface so that the ribs engage walls of the groove to prevent extraction of the wedge once inserted into the groove.

3. The wedge of claim 1 wherein the wedge comprises an extruded member having a constant cross sectional shape.

4. The wedge of claim 1 wherein the slot includes an upwardly open channel that is formed in the base and inclined inwardly facing surfaces on the two arms forming a tapered entrance into the upwardly open channel so that a tubular member can be inserted into the channel and the wedge can be outwardly deformed to engage walls of the groove.

5. The wedge of claim 4 wherein a pocket is located below the upwardly open channel, the pocket comprising means for receiving and restraining the cable.

6. The wedge of claim 1 including a continuous longitudinal duct formed in the base, the duct forming means for receiving a cable after insertion of the wedge into the groove.

7. The wedge of claim 1 wherein an elastic material is located between the two arms to generate additional force urging the two arms outwardly.

8. The wedge of claim 7 wherein the elastic material comprises a foamed material.

9. The wedge of claim 7 comprising means for securing fiber optic cable in a groove cut in pavement.

10. An assembly securable in a groove formed in pavement, the assembly comprising: a cylindrical member, and an extruded plastically deformable member at least partially surrounding the cylindrical member when the assembly is positioned in the groove, the extruded plastically deformable member being more readily deformable than the cylindrical member, the plastically deformable member having an upwardly facing slot that extends over a majority of a height of the extruded plastically deformable member, the slot having a diverging upper section into which the cylindrical member can be inserted, the cylindrical member having an outer diameter greater than a width of a lower section of the slot so that the extruded plastically deformable member is outwardly deformed when the cylindrical member is inserted into the lower section of the slot so that the extruded plastically deformable member is wedged in the groove to secure the assembly in the groove to resist movement of the assembly out of the groove in response to upwardly directed force tending to urge the assembly out of the groove.

11. The assembly of claim 10 wherein the cylindrical member comprises a fiber optic cable.

12. The assembly of claim 11 wherein the fiber optic cable includes a metal tube in which optical fibers are positioned.

13. The assembly of claim 11 wherein the extruded plastically deformable member include a longitudinal duct for receiving a second fiber optic cable.

14. The assembly of claim 10 wherein the cylindrical member comprising as wire.

15. The assembly of claim 14 wherein the extruded plastically deformable member includes a duct for receiving a fiber optic cable.

16. The assembly of claim 10 wherein the plastically deformable member includes a plurality of outwardly extending ribs en opposite sides thereof for engaging walls of the groove when the assembly is positioned in the groove.

17. The assembly of claim 10 wherein a fiber optic cable is embedded in the extruded plastically deformable member.

18. A method of securing a fiber optic cable in a paved surface comprising the step of:

forming a vertical groove in the paved surface;

progressively inserting a longitudinal wedge into the groove, the longitudinal wedge initially having a width that is greater than the width of the groove, the longitudinal wedge being deformable and having an upwardly facing diverging slot; and progressively inserting an elongate cylindrical member into the upwardly facing diverging slot, after insertion of the longitudinal wedge into the groove, to expand the longitudinal wedge into engagement with walls of the groove to secure the fiber optic cable in the groove and to resist upwardly directed forces on the fiber optic cable.

19. The method of claim 18 wherein the fiber optic cable comprises the elongate cylindrical member.

* * * * *